(12) United States Patent
Matsushita

(10) Patent No.: US 7,905,701 B2
(45) Date of Patent: Mar. 15, 2011

(54) WIND TURBINE GENERATOR

(75) Inventor: Takatoshi Matsushita, Nagasaki (JP)

(73) Assignee: Mitsubishi Heavy Industries, Ltd. (JP)

( * ) Notice: Subject to any disclaimer, the term of this patent is extended or adjusted under 35 U.S.C. 154(b) by 0 days.

(21) Appl. No.: 12/446,488

(22) PCT Filed: Apr. 24, 2008

(86) PCT No.: PCT/JP2008/057953
§ 371 (c)(1),
(2), (4) Date: Apr. 21, 2009

(87) PCT Pub. No.: WO2008/142950
PCT Pub. Date: Nov. 27, 2008

(65) Prior Publication Data
US 2010/0259049 A1  Oct. 14, 2010

(30) Foreign Application Priority Data
May 18, 2007  (JP) ................................ 2007-132455

(51) Int. Cl.
*F03D 11/00* (2006.01)
*F03D 9/00* (2006.01)
(52) U.S. Cl. ...................... 415/4.3; 416/93 R
(58) Field of Classification Search .................. 415/4.3, 415/4.5, 908; 416/61, 93 R, DIG. 4; 290/44, 290/55
See application file for complete search history.

(56) References Cited

U.S. PATENT DOCUMENTS

| | | | | | |
|---|---|---|---|---|---|
| 2,468,698 | A | * | 4/1949 | Wood | 73/866.1 |
| 7,095,129 | B2 | * | 8/2006 | Moroz | 290/44 |
| 7,823,437 | B2 | * | 11/2010 | Siebers et al. | 73/1.37 |
| 2005/0044949 | A1 | | 3/2005 | Wobben | |
| 2007/0193333 | A1 | | 8/2007 | Wobben | |
| 2010/0066088 | A1 | * | 3/2010 | Matsushita | 290/44 |
| 2010/0127502 | A1 | * | 5/2010 | Uchino et al. | 290/55 |
| 2010/0164228 | A1 | * | 7/2010 | Matsuo et al. | 290/52 |

FOREIGN PATENT DOCUMENTS

| | | |
|---|---|---|
| JP | 2003-343417 A | 12/2003 |
| JP | 2004-251270 A | 9/2004 |
| JP | 2005-510661 A | 4/2005 |
| JP | 2006-514190 A | 4/2006 |
| WO | 2004-036038 A1 | 4/2004 |

* cited by examiner

*Primary Examiner* — Nathaniel Wiehe
(74) *Attorney, Agent, or Firm* — Kanesaka Berner & Partners, LLP

(57) ABSTRACT

A wind turbine generator is provided in which, even in a cold snowy environment in a cold region, the time required for recovering a frozen anemoscope/anemometer is reduced to minimize a decrease in operating ratio. A wind turbine generator is equipped with an anemoscope/anemometer (7) at the top of a nacelle that accommodates a driving and generating mechanism connected to a rotor head on which turbine blades are mounted, wherein an in-nacelle cooling air outlet that opens in the direction of the anemoscope/anemometer (7) is provided at the top of the nacelle, and the air outlet has exhaust flaps (13) serving as blowing-direction changing means for the cooling air.

2 Claims, 6 Drawing Sheets

WIND TURBINE GENERATOR

CROSS-REFERENCE TO RELATED APPLICATIONS

The present Application is based on International Application No. PCT/JP2008/057953, filed on Apr. 24, 2008, which in turn corresponds to Japanese Application No. 2007-132455 filed on May 18, 2007, and priority is hereby claimed under 35 USC §119 based on these applications. Each of these applications are hereby incorporated by reference in their entirety into the present application.

TECHNICAL FIELD

The present invention relates to a wind turbine generator that generates electricity using a wind turbine that converts natural wind energy to rotational power.

BACKGROUND ART

A known wind turbine generator in the related art generates electricity using wind power, which is natural energy. This type of wind turbine generator is configured such that a nacelle mounted on a tower is provided with a rotor head fitted with wind turbine blades, a main shaft connected to the rotor head so as to rotate together therewith, a gearbox connected to the main shaft that rotates by receiving wind power with the wind turbine blades, and a generator driven by the shaft output power of the gearbox. In the thus-configured wind turbine generator, the rotor head having the wind turbine blades that convert wind power to rotational power and the main shaft rotate to generate shaft output power, and the shaft output power, which is increased in rotational speed through the gearbox connected to the main shaft, is transmitted to the generator. Thus, power generation can be performed using the shaft output power obtained by converting wind power to rotational power as a driving source for the generator, that is, using wind power as motive power for the generator.

The conventional wind turbine generator described above is sometimes installed in a heavy snowfall region or in a cold snowy environment in which the outside air temperature is low, below freezing. In such a cold snowy environment, ice and snow sometimes adhere around an anemoscope/anemometer, which is one of the sensors important for controlling the operation of the wind turbine generator, thus hindering normal measurement. Therefore, the conventional wind turbine generator is equipped with a heater as a snow melter inside the anemoscope/anemometer.

As an example of a defrosting and deicing apparatus for the wind turbine generator, there is a device that prevents ice from adhering to the blades (wind turbine blades) using exhaust air in the nacelle or the tower (for example, refer to Patent Document 1).

There is also a wind turbine generator that obtains a deicing effect for the wind turbine blades using the cooling wind of a gearless generator (for example, refer to Patent Document 2).

Patent Document 1: Japanese Translation of PCT International Application, Publication No. 2006-514190

Patent Document 2: Japanese Unexamined Patent Application, Publication No. 2004-251270

DISCLOSURE OF INVENTION

In a wind turbine generator installed in a cold region, in particular, in a wind turbine generator installed in an extremely cold region etc. below −40° C., snow or the like sometimes adheres and is frozen around the anemoscope/anemometer during standby in a weak wind, such as when the rotation of the wind turbine blades halts, in a cold snowy environment. In such an installation environment, it sometimes takes much time to melt the snow or the like only with a heater mounted in the anemoscope/anemometer, during which the operation of the wind turbine generator must be halted because of adverse effects on the safety thereof.

As a result, if the freezing of the anemoscope/anemometer causes a state in which no measurement data can be obtained, the operating ratio decreases due to halting of the wind turbine generator, which causes a problem in that the amount of electricity that is set in advance for wind conditions cannot be ensured.

Against such a backdrop, it is required to reduce the operation halting time when the anemoscope/anemometer is frozen so as to minimize a decrease in operating ratio due to halting of the wind turbine generator.

The present invention is made in consideration of the above-described circumstances, and it is an object thereof to provide a wind turbine generator in which, even in a cold snowy environment in a cold region, the time required for recovering a frozen anemoscope/anemometer is reduced to minimize the decrease in operating ratio.

The present invention adopts the following solutions to solve the above problems.

A wind turbine generator of the present invention is a wind turbine generator equipped with an anemoscope/anemometer at the top of a nacelle that accommodates a driving and generating mechanism connected to a rotor head on which turbine blades are mounted, wherein an in-nacelle cooling air outlet that opens in the direction of the anemoscope/anemometer is provided at the top of the nacelle, and the air outlet has a blowing-direction changing device for the cooling air.

With the wind turbine generator of the present invention, an in-nacelle cooling air outlet that opens in the direction of the anemoscope/anemometer is provided at the top of the nacelle, and the air outlet has a blowing-direction changing device for the cooling air. Therefore, when the anemoscope/anemometer is frozen, the in-nacelle cooling air blowing direction can be directed toward the anemoscope/anemometer by operating the blowing-direction changing device.

In the above wind turbine generator, it is preferable that a plurality of the anemoscope/anemometers be provided, and the ice and snow adhesion states of the anemoscope/anemometers be determined by comparing measured values. This can improve the accuracy of detecting the freezing or snowmelt adhesion states of the anemoscope/anemometers.

According to the present invention described above, when the anemoscope/anemometer is frozen, the in-nacelle cooling air outlet provided at the top of the nacelle so as to open in the direction of the anemoscope/anemometer can blow the in-nacelle cooling air toward the anemoscope/anemometer by directing the in-nacelle cooling-air blowing direction toward the anemoscope/anemometer by operating the cooling-air blowing-direction changing means. This allows the in-nacelle cooling air to be blown against the anemoscope/anemometer, which prevents snow buildup and snow accumulation by means of this flow or allows ice and snow adhering to the anemoscope/anemometer to be heated by means of the flow of the cooling air that has cooled the interior of the nacelle and increased in temperature.

Accordingly, the amount of snow buildup and the amount of snow accumulation can be reduced, and furthermore, melting of the ice and snow is accelerated by the heating by the in-nacelle cooling air in addition to the heating by the heater in the anemoscope/anemometer. As a result, ice and snow melting time is reduced, and thus the operation halting time of the wind turbine generator due to freezing of the anemoscope/anemometer is also reduced, and in particular, in the wind turbine generator installed in a cold snowy environment, a decrease in operating ratio due to the halted operation can be minimized.

Since a plurality of anemoscope/anemometers are provided at the top of the nacelle of the wind turbine generator, and ice and snow adhesion states of the anemoscope/anemometers are determined by comparing measured values; therefore, the accuracy of detecting the freezing or snowmelt adhesion states of the anemoscope/anemometers is improved, so that operating problems of the wind turbine generator due to the freezing or the like of the anemoscope/anemometers in a cold region can be reliably prevented.

EXPLANATION OF REFERENCE SIGNS

Figure 1:
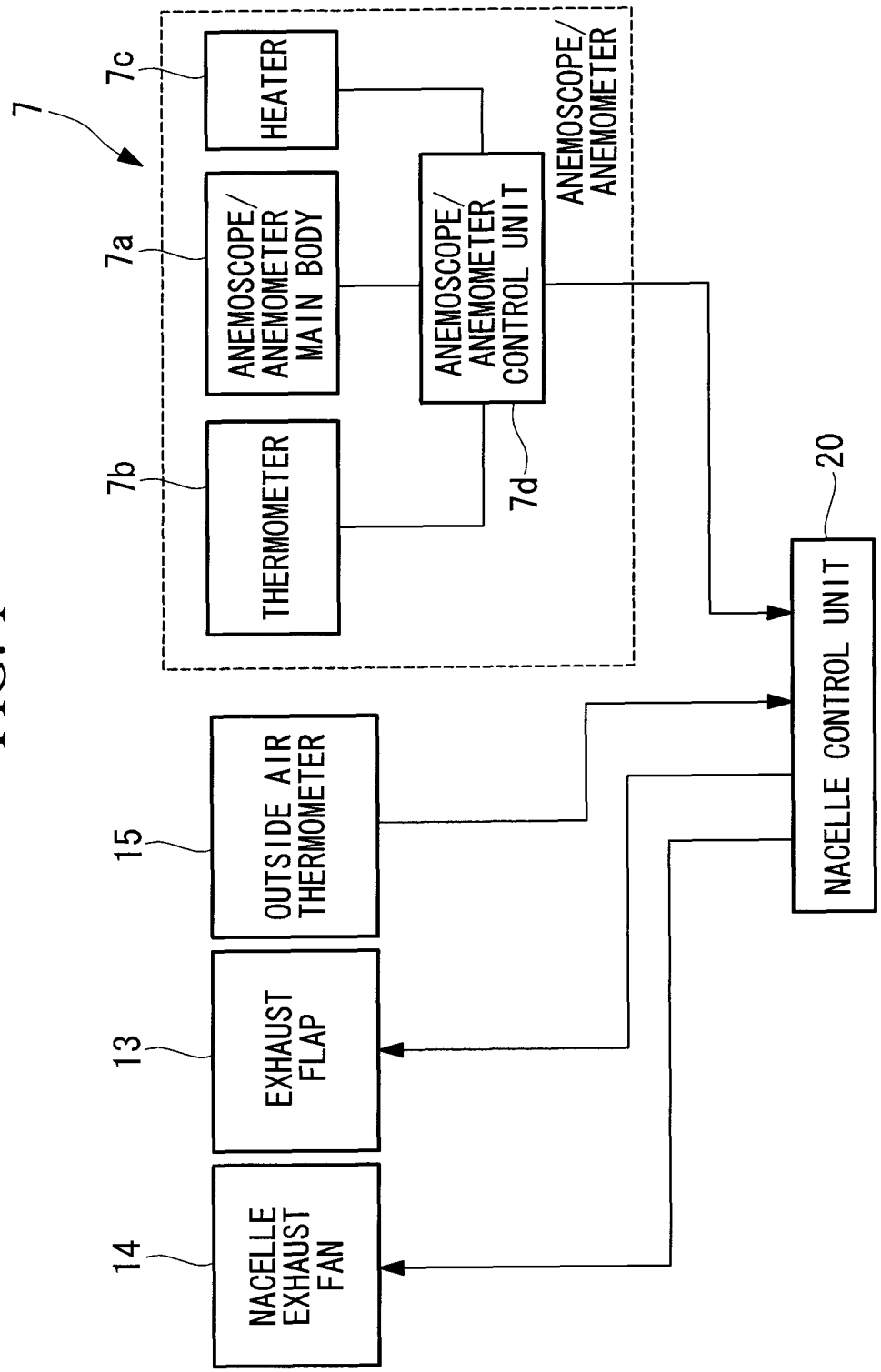
FIG. 1 is a block diagram of a relevant part showing an embodiment of a wind turbine generator according to the present invention.

1: wind turbine generator
2: tower
3: nacelle
4: rotor head
5: wind turbine blade
7: anemoscope/anemometer
10: gearbox
11: generator
12: air outlet
13: exhaust flap
14: nacelle exhaust fan
20: nacelle control unit

BEST MODE FOR CARRYING OUT THE INVENTION

An embodiment of a wind turbine generator according to the present invention will be described hereinbelow with reference to the drawings.

Figure 2:
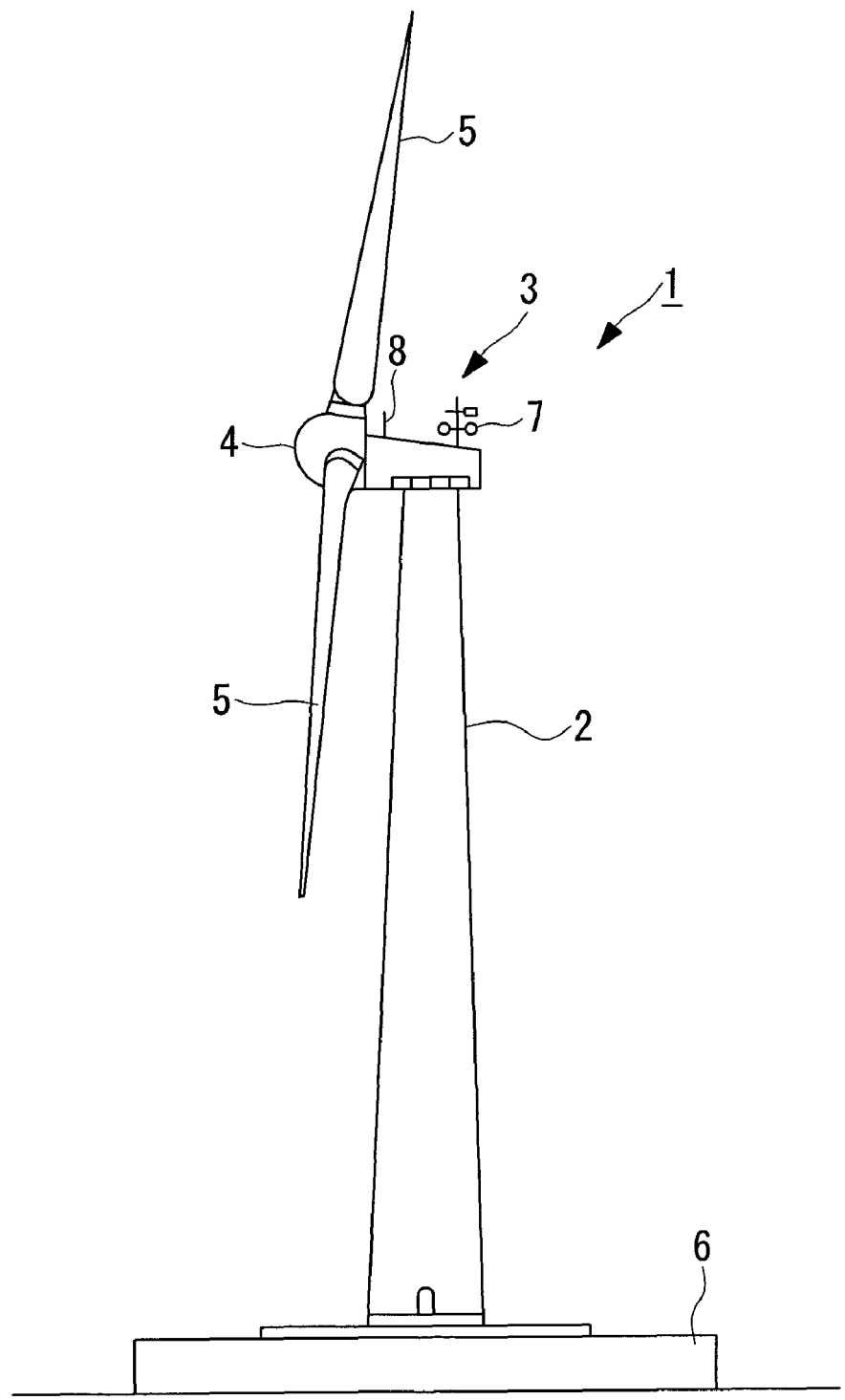
FIG. 2 is a diagram showing an example of the overall configuration of the wind turbine generator.

As shown in FIG. 2, a wind turbine generator 1 includes a tower 2 that is vertically erected on a foundation 6, a nacelle 3 mounted on the upper end of the tower 2, and a rotor head 4 mounted on the nacelle 3 so as to be rotatable about the substantially horizontal axis thereof.

The rotor head 4 has a plurality of wind turbine blades 5 mounted radially about its rotation axis. As a result, the power of wind blowing against the wind turbine blades 5 from the direction of the rotation axis of the rotor head 4 is converted to motive power that rotates the rotor head 4 about the rotation axis.

Anemoscope/anemometers 7 that measure the peripheral wind direction and wind velocity value and lightning rods 8 are provided at appropriate positions (for example, at the upper rear etc.) on the circumferential surface of the nacelle 3. In the illustrated configuration, the anemoscope/anemometers 7 and the lightning rods 8 are disposed in pairs next to each other at predetermined intervals.

Figure 3A:
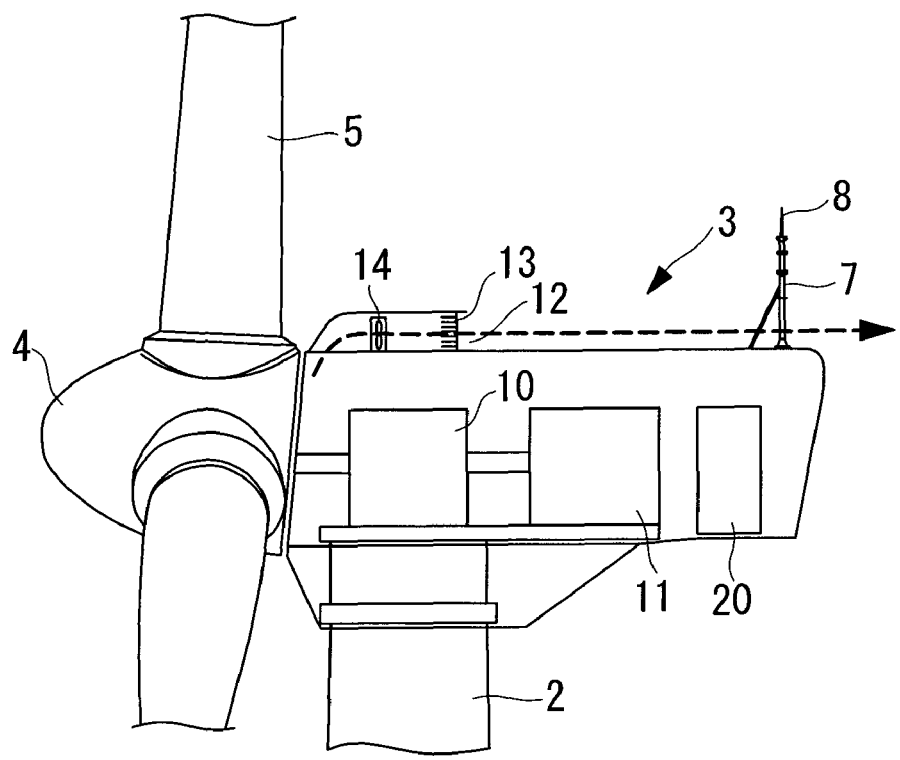
FIG. 3A is a diagram showing the periphery of a nacelle in FIG. 2 in an enlarged view, which is a sectional view showing the internal configuration of the nacelle.
Figure 3B:
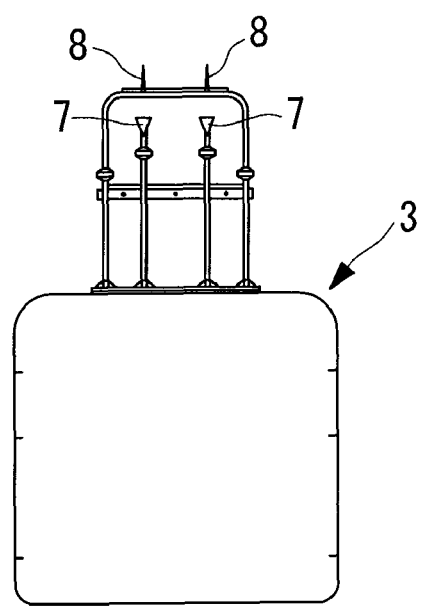
FIG. 3B is a right side view of FIG. 3A.
Figure 3C:
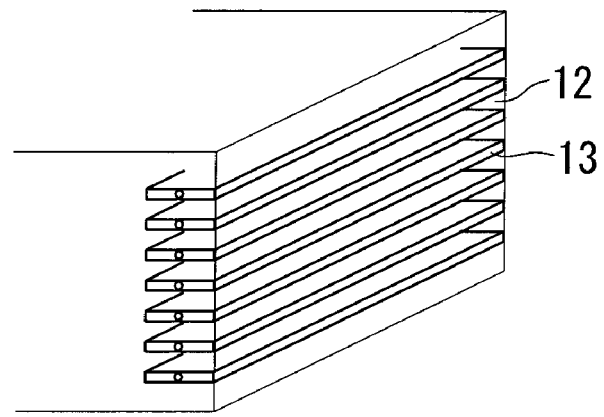
FIG. 3C is a diagram showing the periphery of the nacelle in FIG. 2 in an enlarged view, showing in perspective view a state in which exhaust flaps provided at an air outlet are at a normal exhaust position.

As shown in FIGS. 3A to 3C, for example, the nacelle 3 accommodates a driving and generating mechanism equipped with a generator 11 that is connected to the rotor head 4 via a gearbox 10 coaxial therewith. That is, the wind turbine generator 1 is configured to obtain generator output power W from the generator 11 by driving the generator 11 while increasing the rotational speed of the rotor head 4 with the gearbox 10.

The nacelle 3 also accommodates a nacelle control unit 20 for performing various types of operation control.

An air outlet 12 that opens in the direction in which the anemoscope/anemometer 7 is mounted (the rear of the nacelle) is provided on the top, that is, at the front end, of the nacelle 3. The air outlet 12 is an outlet opening for releasing to the exterior in-nacelle cooling air, which is outside air that is drawn through an inlet (not shown) into the nacelle 3 and that ventilates and cools the interior of the nacelle 3 by circulating therein. That is, by the operation of the wind turbine generator 1, the gearbox 10, the generator 11, the nacelle control unit 20 and so on mounted in the nacelle 3 generate heat, which raises the internal temperature; therefore, the internal temperature of the nacelle 3 is maintained within an operating temperature range set for the electric control devices or the like, such as the nacelle control unit 20, by performing ventilation that introduces and circulates outside air.

As shown in FIGS. 3A to 3C, the above-described air outlet 12 has exhaust flaps 13 serving as a cooling-air blowing-direction changing device at the outlet where the in-nacelle cooling air is released to the exterior.

Figure 4A:
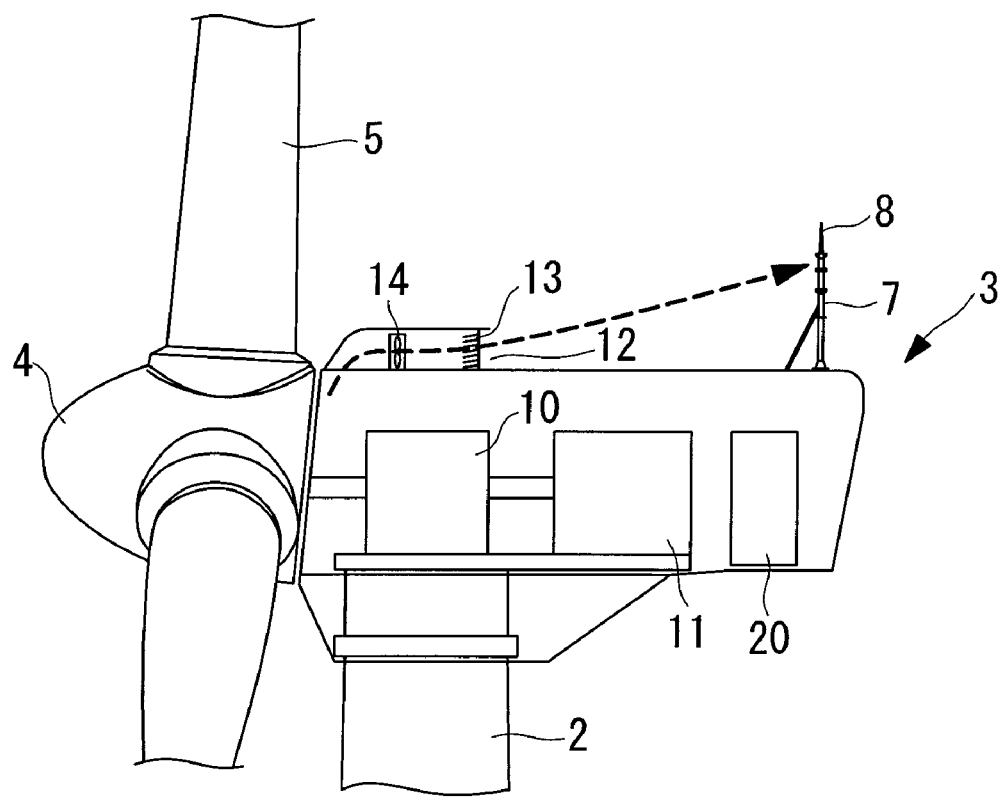
FIG. 4A is a diagram showing the periphery of the nacelle in FIG. 2 in an enlarged view, which is a sectional view showing the internal configuration of the nacelle.
Figure 4B:
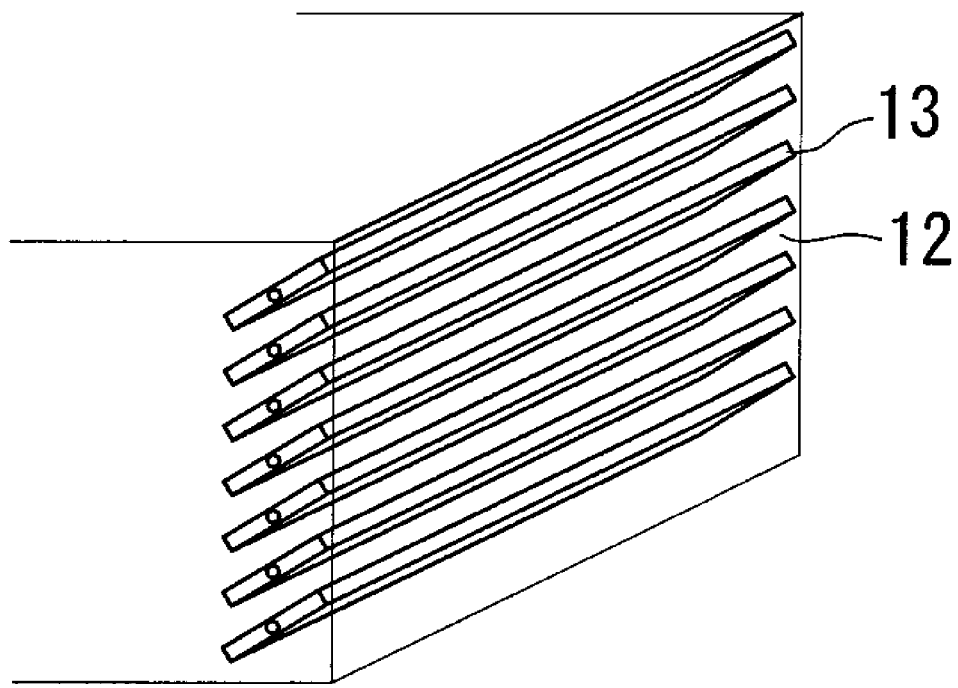
FIG. 4B is a diagram showing the periphery of the nacelle in FIG. 2 in an enlarged view, showing in perspective view a state in which the exhaust flaps provided at the air outlet are at a cold-weather exhaust position.

The exhaust flaps 13 have the function of changing the blowing direction of the in-nacelle cooling air, which is outside air drawn through the inlet and circulated in the nacelle 3 by the operation of the nacelle ventilating fan 14, into a desired direction. In such a ventilating operation, one of a normal exhaust position (see FIG. 3C) and a cold-weather exhaust position (see FIG. 4B), in which the in-nacelle cooling air that has ventilated the interior of the nacelle 3 is blown toward the anemoscope/anemometer 7 as a deicing measure, is selected so that a desired blowing direction can be selected and switched thereto.

That is, the exhaust flaps 13 have a driving unit (not shown), such as an electric motor, that is operated in response to a control signal from the nacelle control unit 20 and can change their angles by selecting and switching them depending on the operating conditions, such as a cold snowy environment.

As a result, for example, during the operation of the wind turbine generator 1 or when the time elapsed from the halting thereof is short, the temperature of the in-nacelle cooling air that ventilates the interior of the nacelle 3 rises to a high temperature as compared with the outside air temperature. This in-nacelle cooling air is blown out such that relatively high-temperature in-nacelle cooling air blows against the anemoscope/anemometer 7 by changing the blowing direction (angle) of the exhaust flaps 13 to the cold-weather exhaust position in response to a control signal from the nacelle control unit 20; therefore, deicing or melting of ice and snow on the anemoscope/anemometer 7 is accelerated, so that melting time can be reduced. In the case where the operation halting time of the wind turbine generator 1 is so long that there is no temperature difference between the internal temperature of the nacelle 3 and the outside air temperature, the flow of the in-nacelle cooling air prevents snow buildup on the anemoscope/anemometer 7, even though it has no heating capability.

FIG. 1 is a block diagram showing a configuration example of the nacelle control unit 20. Besides the anemoscope/anemometer 7, the exhaust flaps 13, the nacelle exhaust fan 14, an outside air thermometer 15, etc. are connected to the nacelle control unit 20.

The anemoscope/anemometer 7 shown in the drawing is constituted of an anemoscope/anemometer main body 7a, a thermometer 7b that measures the internal temperature of the anemoscope/anemometer 7, heating means, such as an electric heater 7c, for heating the interior of the anemoscope/anemometer 7 in cold weather, and an anemoscope/anemometer control unit 7d.

Figure 5:
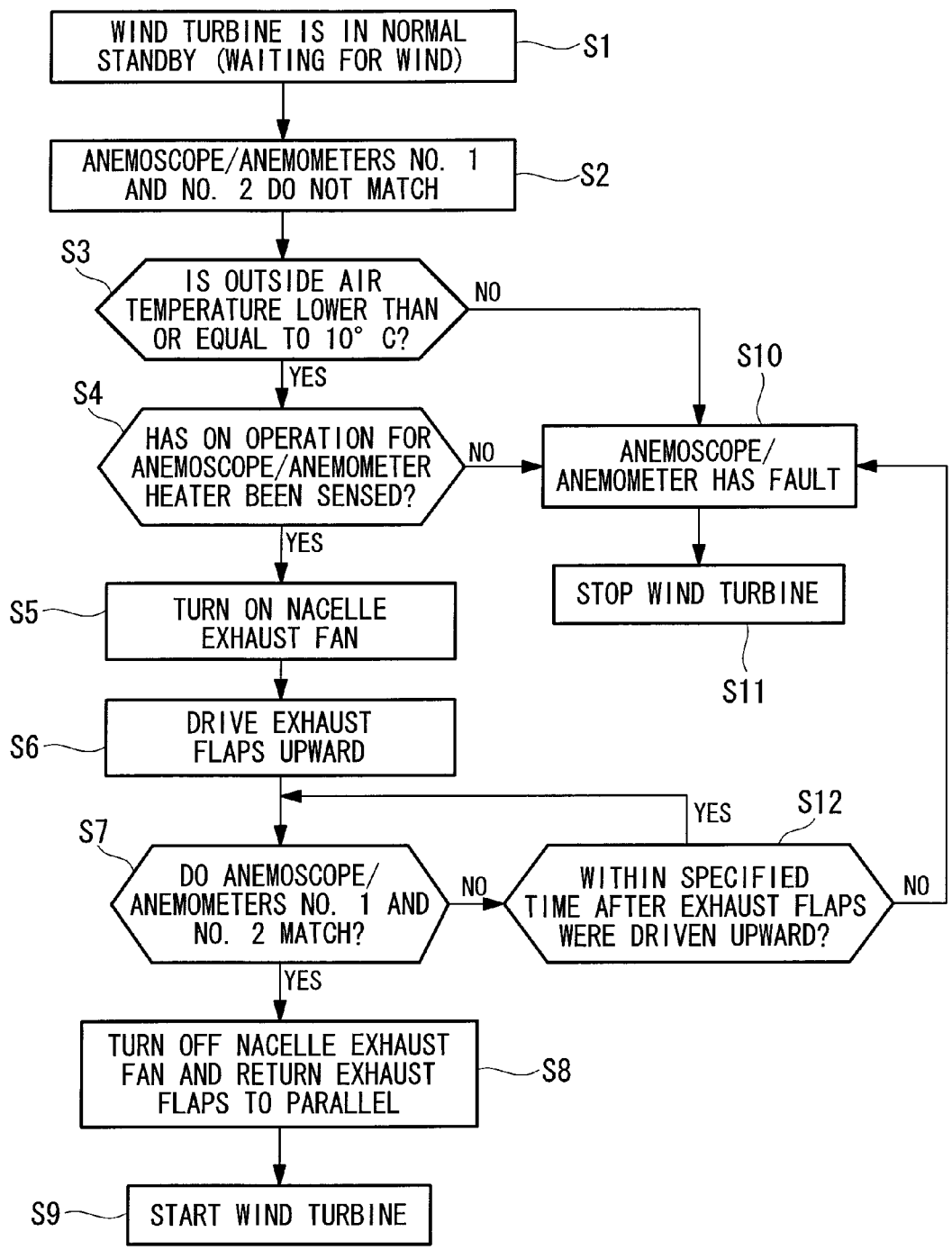
FIG. 5 is a flowchart showing an example of control executed by a nacelle control unit in FIG. 1.

Subsequently, the operation control of the exhaust flaps 13 by the nacelle control unit 20 described above will be described with reference to the flowchart in FIG. 5.

In the first step S1, the rotor head (wind turbine) 4 of the wind turbine generator 1 is in normal standby, that is, is halted awaiting wind. In such a halted state, the process proceeds to the next step S2, where measured values of wind direction and wind velocity input from a pair of anemoscope/anemometers 7 are compared.

In step S2, if mismatching of the pair of measured values occurs whereby they differ by a predetermined value or greater, one of the anemoscope/anemometers 7 is regarded as having some problem. The predetermined value in this case is appropriately set in consideration of the allowable error range etc. of the anemoscope/anemometers 7.

If the anemoscope/anemometer 7 has a problem, the process proceeds to the next step S3, where it is determined whether the outside air temperature is in a low-temperature state in which the measured value from the outside air thermometer 15 is lower than or equal to a predetermined temperature (for example, 10° C.). If the result is YES, that is, the outside air temperature is lower than or equal to the predetermined value, the process proceeds to the next step S4, where it is determined whether or not there is an ON operation for the heater 7c of the anemoscope/anemometer 7.

If the result in step S4 is YES, that is, the ON operation for the heater 7c is confirmed, the process proceeds to the next step S5, where the nacelle exhaust fan 14 is turned ON to start ventilation of the interior of the nacelle 3. That is, because the problem of the anemoscope/anemometer 7 described above is assumed to be caused by snow buildup, freezing, or the like due to the low outside air temperature, as a measure to resolve this situation, the operation of the exhaust fan 14 is forcedly started even while the wind turbine generator 1 is halted or in a state in which no ventilating operation is needed because the in-nacelle temperature is low, such as at a low outside air temperature.

After starting the operation of the exhaust fan 14, the process proceeds to the next step S6, where the angles of the exhaust flaps 13 are changed to a cold-weather exhaust position at which the angles are upward. That is, the angles of the exhaust flaps 13 at the normal exhaust position, shown in FIG. 3C, are set to an angle substantially parallel to the upper surface of the nacelle 3, so that the in-nacelle cooling air flows in a straight line along the upper surface of the nacelle without blowing directly against the anemoscope/anemometers 7, as indicated by the broken line in the drawing. However, when the angles of the exhaust flaps 13 are set to the cold-weather exhaust position by changing them upward from the normal exhaust position, the flow of the in-nacelle cooling air is directed toward the anemoscope/anemometers 7, as indicated by the broken line in FIG. 4A.

When the in-nacelle cooling air blows against the anemoscope/anemometers 7 in this way, snow buildup on the anemoscope/anemometers 7 can be prevented, and if the temperature of the in-nacelle cooling air is higher than the outside air temperature, a heating action due to the in-nacelle cooling air can also be provided, which helps to resolve the problem, that is, to prevent or remove snow buildup, freezing, or the like by heating with the heater 7c. Accordingly, the time required for resolving the problem in the anemoscope/anemometer 7, which is an important sensor, is reduced, and therefore, the time required for starting the normal operation of the wind turbine generator 1 can also be reduced.

This operation in which the exhaust flaps 13 are set at the cold-weather exhaust position is continued until it is confirmed in the next step S7 that the measured values of the wind direction and wind velocity input from the pair of anemoscope/anemometers 7 match. That is, if the determination in step S7 is YES, that is, it is determined that the measured values of the anemoscope/anemometers 7 match, it can be determined that the problem of the anemoscope/anemometer 7 has been resolved; therefore, the process proceeds to the next step S8, where the nacelle exhaust fan 14 is halted (OFF), and the angles of the exhaust flaps 13 are returned to the normal exhaust position (parallel to the upper surface of the nacelle).

After undergoing such a series of operations, the rotor 4 is started in the next step S9 to start the operation of the wind turbine generator 1 using the rotation of the rotor 4.

If the determination in the above step S3 is NO, that is, the outside air temperature is higher than the predetermined value, the problem of the anemoscope/anemometer 7 is not caused by a low outside air temperature, and therefore, the process proceeds to the next step S10, where it is determined that the anemoscope/anemometer has a fault. Since such a fault of the anemoscope/anemometer 7 interferes with the normal operation of the wind turbine generator 1, the process proceeds to the next step S11, where the operation of the wind turbine generator 1 is halted.

Also when the determination in the above step S4 is NO, that is, it cannot be confirmed that the heater 7c of the anemoscope/anemometer 7 has turned ON, the process proceeds to the next step S10, where it is similarly determined that the anemoscope/anemometer has a fault, and further proceeds to the next step S11, where the operation of the wind turbine generator 1 is halted.

If the determination in the above step S7 is NO, that is, the measured values input from the pair of anemoscope/anemometers 7 do not match, the process proceeds to step S12, where the time elapsed after the exhaust flaps 13 are changed upward is determined.

If the result is YES, that is, the elapsed time is within a predetermined specified time, the operation of the nacelle exhaust fan 14 is continued, with the exhaust flaps 13 held at the cold-weather exhaust position. The specified time in this case differs depending on conditions such as the specifications and installation site of the wind turbine generator 1 and is determined with reference to the time required to resolve the problem, which is obtained in advance by experiment, simulation, or the like.

However, if the result is NO, that is, the elapsed time exceeds the above-described specified time, it exceeds the normal problem resolution time, and therefore, the process proceeds to step S10 as well, where it is determined that the anemoscope/anemometer has a fault, and further proceeds to step S11, where the operation of the wind turbine generator 1 is halted.

In this way, with the wind turbine generator 1 of the present invention described above, when the anemoscope/anemometers 7 are frozen, the in-nacelle cooling air outlet 12 provided at the top of the nacelle 3 so as to open in the direction of the anemoscope/anemometers 7 can direct the blowing direction of the in-nacelle cooling air toward the anemoscope/anemometers 7 by operating the exhaust flaps 13 serving as a cooling-air blowing-direction changing device. This allows the in-nacelle cooling air to be blown toward the anemoscope/anemometers 7, and as a result, the in-nacelle cooling air blows against the anemoscope/anemometers 7, which prevents snow buildup and snow accumulation by means of this flow or allows ice and snow adhering to the anemoscope/anemometers 7 to be heated by means of the flow of the cooling air that has cooled the interior of the nacelle 3 and increased in temperature.

Since the wind turbine generator 1 of the present invention is configured such that a plurality of the anemoscope/anemometers 7 are provided at the top of the nacelle 3, and the ice and snow adhesion states of the anemoscope/anemometers 7 are determined by comparing measured values therefrom, the accuracy of detecting the freezing or snowmelt adhesion states of the anemoscope/anemometers 7 can be improved, so that operating problems due to the freezing or the like of the anemoscope/anemometers 7 in a cold region can be reliably prevented. The number of the anemoscope/anemometers 7 is not limited to two in the above embodiment and may be three or more; alternatively, it may be one, although this has a problem in terms of the detection accuracy.

Also the blowing-direction changing device is not limited to the above-described exhaust flaps 13, provided that the in-nacelle cooling air blowing direction can be changed as necessary.

The present invention is not limited to the above-described embodiment and may be modified as appropriate without departing from the spirit thereof.

The invention claimed is:

1. A wind turbine generator equipped with an anemoscope/anemometer at the top of a nacelle that accommodates a driving and generating mechanism connected to a rotor head on which turbine blades are mounted, wherein
an in-nacelle cooling air outlet that opens in the direction of the anemoscope/anemometer is provided at the top of the nacelle, and the air outlet has blowing-direction changing means for the cooling air.

2. The wind turbine generator according to claim 1, wherein a plurality of the anemoscope/anemometers are provided, and the ice and snow adhesion states of the anemoscope/anemometers are determined by comparing measured values.

* * * * *